UNITED STATES PATENT OFFICE.

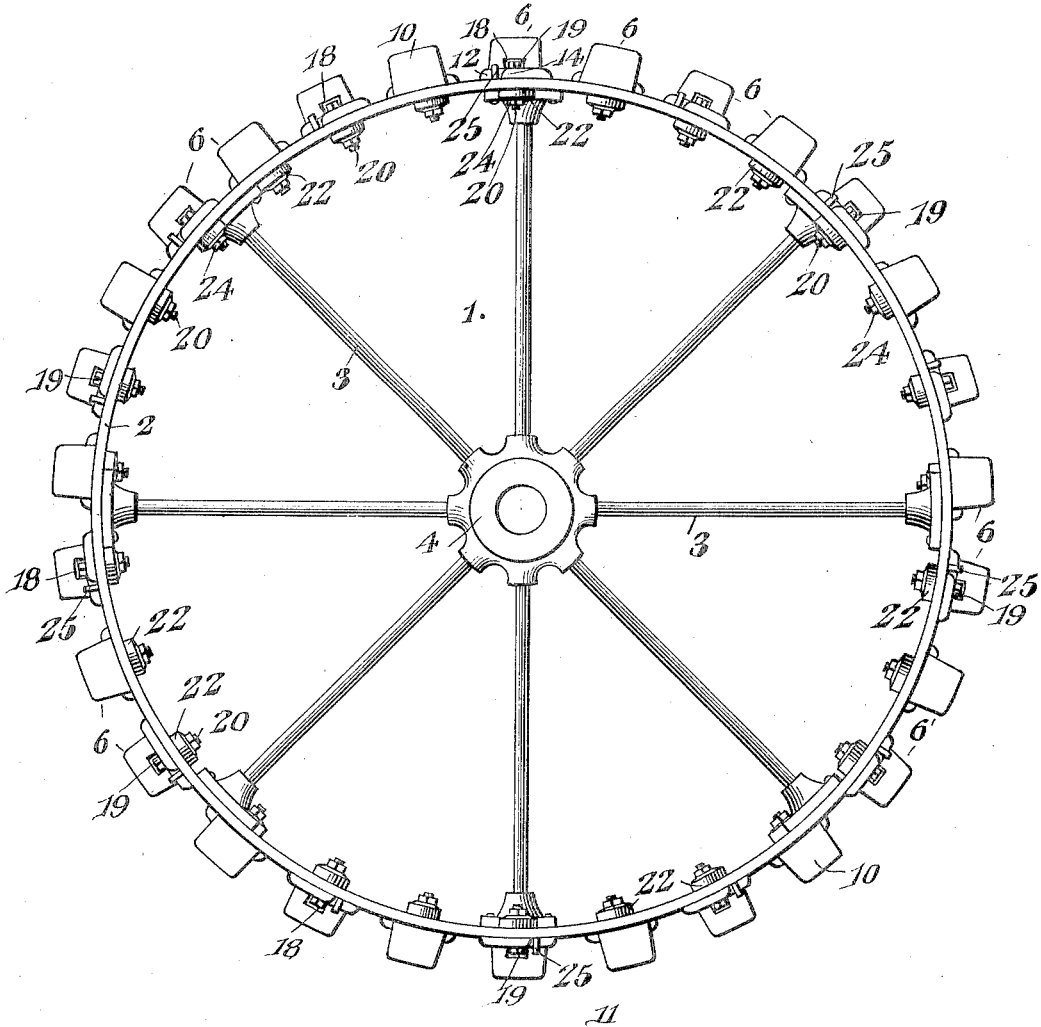
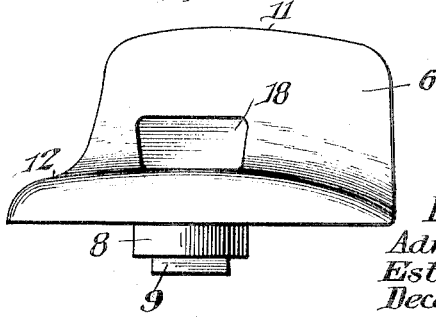

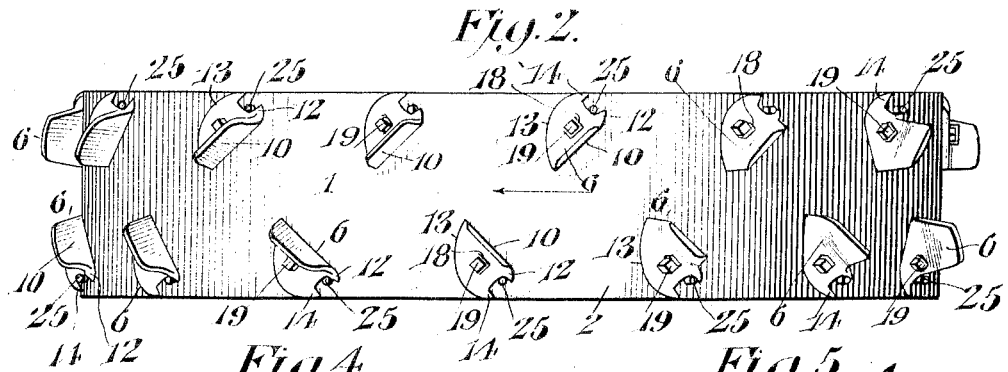
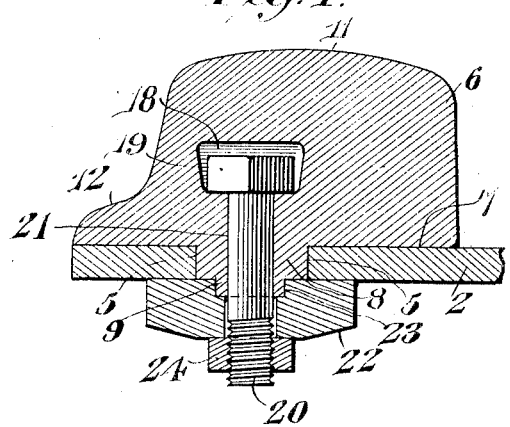
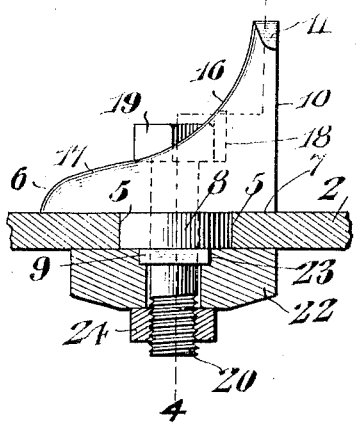
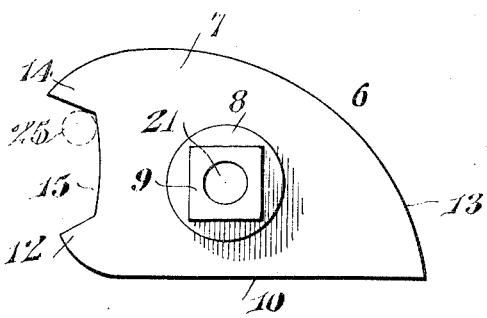
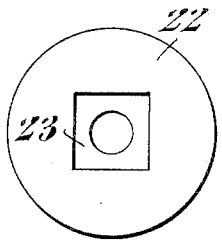

JAMES E. WOOD, DECEASED, LATE OF AURORA, ILLINOIS, BY FLORA A. WOOD, ADMINISTRATRIX, OF AURORA, ILLINOIS, ASSIGNOR OF ONE-HALF TO CHARLES A. LOVE, OF AURORA, ILLINOIS.

MASTER-WHEEL.

1,108,538.   Specification of Letters Patent.   Patented Aug. 25, 1914.

Application filed June 12, 1913. Serial No. 773,256.

*To all whom it may concern:*

Be it known that I, FLORA A. WOOD, a citizen of the United States, residing at Aurora, county of Kane, State of Illinois, administratrix of the estate of JAMES E. WOOD, deceased, late a citizen of the United States and a resident of Aurora, in the county of Kane and State of Illinois, as by reference to the duly-certified copy of letters of administration will more fully appear, do hereby declare that the said JAMES E. WOOD invented a new and useful Improvement in Master-Wheels, of which the following is a specification.

This invention has reference to master or driving wheels for traction machinery, or where engagement of the wheel with the ground is relied upon for the driving of moving parts by the progressive travel of the wheel.

It is customary to provide traction engines with driving wheels having peripheral lugs designed to engage the ground to thus increase the tractive effect, and it is likewise customary to mount wheels with peripheral lugs on machines which may be propelled over the ground by other means, and power may be taken from such wheels, then termed master wheels, for various purposes. It is found in practice that a traction or master wheel provided with a ribbed periphery is liable to take up dirt which under some conditions clings tenaciously to the wheel.

The present invention is designed to provide a master or traction wheel which will have full tractive engagement with the ground over which it passes and which to a large extent is self cleaning and may be kept particularly clean by the employment of a scraper which in conjunction with the peculiar construction of the lugs employed on the active face of the wheel most effectively free the wheel from clinging dirt which becomes particularly troublesome in master wheels as ordinarily constructed. In order to accomplish this result the traction lugs of the master wheel are arranged in circular series and are furthermore arranged to have a certain rotative movement each about an axis substantially radial to the axis of rotation of the wheel, and from practical experience this has been found to effectively clean the wheel from any adherent dirt even though such dirt be sufficiently tenacious to resist ordinary shocks and jars to which a machine of the character to which a master wheel is adapted, is subjected.

The invention will be best understood from a consideration of the following detailed description, taken in connection with the accompanying drawings forming a part of this specification, with the further understanding that while the drawings show a practical embodiment of the invention the latter is not limited to any strict conformity with the showing of the drawings, but may be changed and modified so long as such changes and modifications mark no material departure from the salient features of the invention.

In the drawings:—Figure 1 is an elevation of a master wheel equipped with the present invention. Fig. 2 is a bottom plan view of the master wheel of Fig. 1. Fig. 3 is a side elevation of one of the lugs. Fig. 4 is a section of one of the lugs on the line 4—4 of Fig. 5. Fig. 5 is an end elevation of one of the lugs with a fragment of the wheel rim and the nut and washer for holding the lug in section. Fig. 6 is a bottom plan view of one of the lugs. Fig. 7 is a top plan view of one of the washers.

Referring to the drawings, there is shown a wheel 1 provided with a rim 2 carried by spokes 3 radiating from a hub 4, and the wheel as shown may follow the usual practice in wheels of this character, except that the rim 2 is exteriorly smooth and free from any integral projections, while through the rim there are produced two circular series of holes 5, see Figs. 4 and 5, one series being near one edge of the rim and the other series near the other edge of the rim.

There are provided as many lugs 6 as there are holes 5 and each lug comprises a block having a bottom face 7 which may conform generally to the surface of the rim and at a point nearer one side of the bottom of the block than the other, and also nearer one end of the block than the other, there projects from the bottom of the block a hub 8 of a thickness about that of the rim 2, while from the hub there is an axial elongation 9 preferably of non-circular contour, or even of square contour, as indicated in the drawings. That side of the lug or block 6 which is the nearer to the hub 8 is straight, as indicated at 10, and rises in perpendicular relation to the plane of the bottom 7 considering the latter as flat. The edge or face 10 also rises to the full height of the lug 6 from the base or bottom face 7, and is substantially rectangular in outline, except for the edge remote from the face 7, which edge may be slightly rounded or crowned, as indicated at 11, and at that end of the side 10 which is the nearer to the hub 8 there is a prolongation 12 curving away from the face 10 and serving as a stop for a purpose to be described. The bottom 7 from the end of the face 10 remote from the lug 12 curves away, as indicated at 13, from the face 12 toward the other end of the block, the block or lug gradually widening toward the said other end where it terminates in a stop member 14 between which and the stop member 12 there is a recess 15. The upper or outer face of the lug or block 6 drops toward the edge 13 first by a concave curve 16, and then by a convex curve 17, so that the upper or outer face of the lug or block is in the form of a compound curve. Produced in this curved upper or outer face of the lug is a recess 18 of a size to receive the head 19 of a bolt 20, the latter extending through a passage 21 through the body of the block in central relation to the hub 8 and prolongation 9 thereof. Applied to the bolt 20 is a washer 22 having a recess 23 in one face matching the prolongation 9 and applied to the threaded end of the bolt is a nut 24 for confining the washer 20 to the bolt between the nut 24 and the inner face of the rim 2. The parts are so proportioned that the washer 22 does not grip the rim 2 with so great a force as to prevent turning of the lug 6 with the bolt 20 on the application of a suitable force, but at the same time the parts are not so loosely connected as to permit rattling or the bringing of breaking strain upon the bolts.

Projecting from the outer face of the rim 2 in position to engage between the stops 12 and 14 of each lug or block 6 is a pin 25 permitting rotative movement of the blocks or lugs 6 upon their pivot axes determined by the hubs 8 seated in the passages 5 but limiting such movement to the length of the recess 15.

It will be observed that the two series of lugs shown alternate but do not overlap, but at their inner ends are spaced apart an appropriate distance, so that a scraper may be readily applied to the wheel when mounted upon a vehicle to travel in the free space between the two series of lugs, thus tending to dislodge and disintegrate dirt which may adhere to the wheel. The lugs are set diagonally with relation to the axis of rotation and the inner end of the lug formed by the junction of the edges 10 and 13 is set forwardly, the outer end of the lug being that provided with the stop members 12 and 14 moving to opposite sides of the pin 25.

The flat faces of the lugs or blocks 6 give a good bearing surface against the ground, while the crown portion 11 being comparatively sharp readily enters the ground and the reverse curves 16 and 17 produce a lug of decreasing thickness, but greatly adding to its resistance to lateral thrust. The limited swing of the lugs upon axes which may be radial or substantially radial to the axis of rotation causes the dislodging of any adherent dirt from parts which cannot well be reached by any scraper, but in conjunction with the scraper the pivoted lugs cause the maintaining of the wheel practically free from adherent dirt.

What is claimed is:—

1. A master wheel having elongated ground lugs each pivoted intermediately of its ends to the rim of the wheel to turn about its pivotal axis and having a ground engaging face directed forwardly at an angle to the direction of travel, and means for limiting the pivotal movements of the lug to always maintain the same end of the lug in the forward direction.

2. A master wheel having elongated ground lugs, each provided with a relatively thin ground entering outer edge and a broad base where engaging the wheel rim, and with an intermediately located pivotal extension entering the rim of the wheel, each lug having a forwardly presented ground entering face at an angle to the direction of travel, and said lug and wheel rim at one end of the lug having coacting means for limiting pivotal movements of the lug on its pivotal axis to always maintain the same end of the lug in a forward direction.

3. A master wheel having two rows of ground entering lugs on opposite sides of its circumferential center line, with ground engaging faces presented at an angle toward said center line, and each lug being pivoted intermediate of its length to rock about the pivotal axis, and each provided with stop means for limiting the rocking movements to always maintain the same end of the lug in the forward direction.

4. A master wheel having a series of ground lugs on the rim of the wheel, each comprising a block with a substantially flat ground engaging face, and a relatively thin outer edge and reversely curved from said face toward the other side of the lug, said lug having spaced stop members at one end and also provided with an intermediately located pivotal support connecting the lug to the rim of the wheel and about the axis of which pivotal support the lug is movable, and the wheel being provided with a stop member between the stop members on the lug and located to maintain the active face of the lug at a forward angle to the direction of rotation of the wheel.

5. A master wheel provided with circumferential series of ground engaging lugs on opposite sides of a circumferential center line, each lug comprising a block with a broad face adapted to the rim of the wheel and there provided intermediately of its length and breadth with a hub extending through the rim of the wheel and having fastening means for holding the lug to the wheel, said lug being movable about the longitudinal axis of its hub and provided with a ground engaging face substantially perpendicular to the rim of the wheel and also substantially flat and arranged at a forward angle to the direction of rotation of the wheel and with the face remote from the ground engaging face reversely curved to provide the lug with an outer relatively thin ground-entering edge, and stop means permitting a limited rocking movement of the lug on its pivotal support and at all times maintaining the same end of the lug in the forward direction.

In testimony, that I claim the foregoing is the invention of JAMES E. WOOD, I have hereto affixed my signature in the presence of two witnesses.

FLORA A. WOOD.
*Administratrix of the estate of James E. Wood, deceased.*

Witnesses:
M. A. STAFFORD,
GRACE A. WEITZEL.